Sept. 1, 1931.  F. C. COSEO  1,821,425

TROLLEY HARP

Filed Feb. 24, 1930

Inventor
Frederick C. Coseo,
By Cushman, Bryant & Darby
attys.

Patented Sept. 1, 1931

1,821,425

UNITED STATES PATENT OFFICE

FREDERICK C. COSEO, OF COLUMBUS, OHIO, ASSIGNOR TO THE JEFFREY MANUFACTURING COMPANY, OF COLUMBUS, OHIO, A CORPORATION OF OHIO

TROLLEY HARP

Application filed February 24, 1930. Serial No. 430,952.

The present invention relates to trolley or overhead devices used on electric locomotives, cars, and the like, where a trolley wire or rod is used.

The present petition for Letters Patent is a companion application to that filed January 21, 1930, Serial No. 422,399, for trolley harp.

The usual standard trolley harp and pole has proven unsatisfactory due mostly to the tendency of the trolley wheels to break contact with the conducting wire or rod. This is especially true when the trolley wheels pass over connections, and switches, and around curves in the conducting wire or rod. When such contact is broken there results an arcing and intermittent surges of power as the wheels bump along the conducting wire or rod, thereby causing unusual strain upon and likelihood of injury to the electric motors.

It is one of the objects of my invention to prevent or minimize the accidental breaking of contact between the trolley wheels and trolley wire, thereby eliminating the attendant disadvantages.

Another object of my invention is to provide trolley wheels which are capable of satisfactorily transmitting high voltage currents to the locomotive motors.

Still another object of my invention is to provide a trolley harp and wheels which are simple in construction and cheap to manufacture.

With these and other objects and advantages in mind, attention is called to the drawings, in which.

Figure 1:
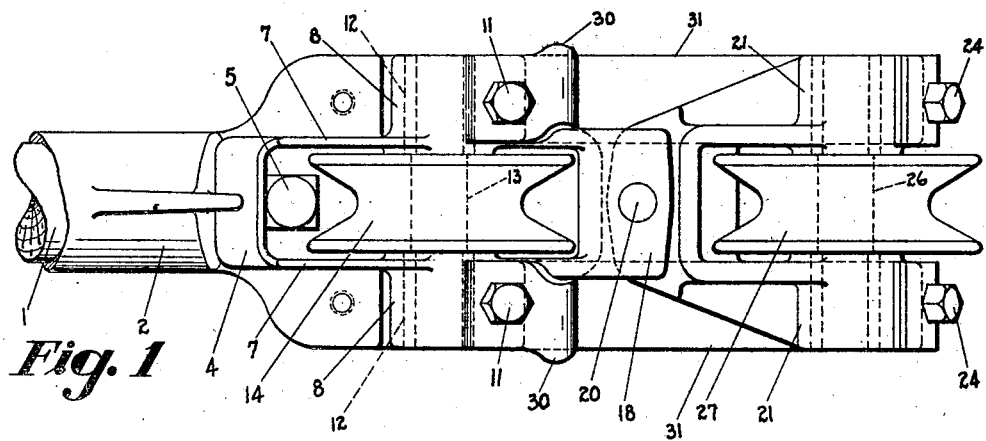
Figure 1 is a plan view of the assembled trolley harp and wheels.
Figure 2:
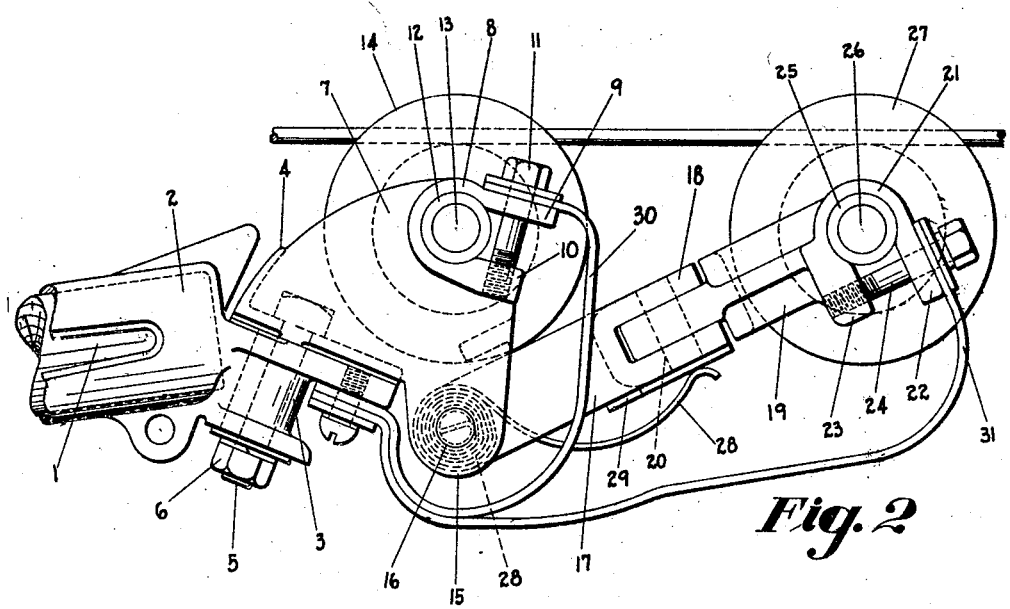
Figure 2 is an elevation of the assembled trolley harp and wheels.

Referring specifically to the drawings, in which like numerals indicate like parts, there is provided a trolley pole 1 of standard design having attached thereto at its upper end, in any suitable manner, a casting 2 provided with a bearing member 3 extending slightly downwardly from the longitudinal axis of the pole 1. Mounted for rotatable movement on the bearing member 3 is a trolley harp 4 held thereon by the bolt 5 and nut 6.

The trolley harp 4 comprises brackets 7 having at their upper ends the split bosses 8, each of which is provided with upper and lower flanges 9 and 10, respectively.

The flanges 9 are apertured to receive the cap screws 11 which are screw threaded into the sockets in flanges 10. Seated within the bosses 8 are sleeves 12 which hold the ends of a shaft 13. The said shaft 13 has an enlarged central portion around which is mounted the trolley wheel 14. It will be noted that by tightening the cap screws 11, the sleeves 12 will be clamped between the flanges 9 and 10, thereby preventing any lateral movement of the shaft 13.

The brackets 7 of the trolley harp are provided with downward extensions 15. Held within the extensions by the slotted pin 16 and mounted for limited movement thereon is an arm 17 provided at its outer end with a fork-like member 18. A second arm 19 is mounted within the fork-like member 18 and held therein by means of a pin 20. Attention is called to the fact that the second arm 19 is so mounted as to allow a movement transversely of the trolley harp 4.

The second arm 19 is forked and provided at each end of the fork with bosses 21 having flanges 22 and 23, the former being apertured and the latter being provided with screw threaded sockets to receive the cap screws 24. Within the U-shaped apertures of the bosses 21 are the sleeves 25 which hold the ends of the shaft 26 upon which is mounted the follower trolley wheel 27.

Around the slotted pin 16 is a coil spring 28, the inner end of which is inserted in the slot in said pin and the outer end of which exerts pressure against an insulated block 29 attached to the underside of the arm 17 and juxtaposed against the pin 16 to prevent the latter's displacement.

Flexible connections for transmitting the electric current are provided between the two trolley wheels 14 and 27 and the casting 2 as at 30 and 31, respectively. From the casting 2 the electric current is taken through wires (not shown) to the electric motors.

In operation, the main trolley wheel will have a rotary movement and the follower wheel will have a rotary and vertical movement and also a movement transversely of the main trolley wheel. It is obvious that with such construction, should the main wheel become displaced, the follower wheel will remain in contact upon the trolley wire or rod.

It is understood that the invention is subject to various forms and modifications without departing from the scope of the appended claims.

I claim:

1. In a trolley, a rotatable harp, supporting means therefor, a trolley wheel mounted therein, an arm pivotally connected to said harp below said trolley wheel, a second trolley wheel, and means to connect said second trolley wheel to said arm for transverse movement thereof.

2. In a trolley, a rotatable harp, supporting means therefor, a trolley wheel mounted therein, an arm pivotally connected to said harp below said trolley wheel and movable vertically thereof, a second trolley wheel, and a second arm to support said second trolley wheel pivotally connected to said first arm.

3. In a trolley, a rotatable harp, supporting means therefor, a trolley wheel mounted therein, an arm pivotally connected to said harp below said trolley wheel and movable vertically thereof, a second trolley wheel, and a second arm to support said second trolley wheel pivotally connected to said first arm and movable transversely thereof.

4. In a trolley, a rotatable harp, supporting means therefor, a trolley wheel mounted therein, an arm pivotally connected to said harp below said trolley wheel and movable vertically thereof, means to exert pressure against said arm, a second trolley wheel, and a second arm to support said second trolley wheel pivotally connected to said first arm and movable transversely thereof.

5. In a trolley, a rotatable harp, supporting means therefor, a trolley wheel mounted therein, an arm pivotally connected to said harp below said trolley wheel and movable vertically thereof, means to exert pressure against said arm, a second trolley wheel, a second arm to support said second trolley wheel pivotally connected to said first arm and movable transversely thereof, and flexible electrical connections between said trolley wheels and said supporting means.

6. In a trolley, a supporting means, a harp mounted for rotation thereon comprising two brackets having downward extensions, a trolley wheel mounted therein, an arm connected within said downward extensions, a second trolley wheel, and means to connect said second trolley wheel to said arm for transverse movement thereof.

7. In a trolley, a supporting means, a harp mounted for rotation thereon comprising two brackets having downward extensions, a trolley wheel mounted therein, an arm pivotally connected to said downward extension, a second trolley wheel, and means to connect said second trolley wheel to said arm for transverse movement thereof.

8. In a trolley, a supporting means, a harp mounted for rotation thereon comprising two brackets having downward extensions, a trolley wheel mounted therein, an arm pivotally connected to said downward extensions and having pressure exerting means associated therewith, a second trolley wheel, and means to connect said second trolley wheel to said arm for transverse movement thereof.

9. In a trolley, a supporting means, a harp mounted for rotation thereon comprising two brackets having downward extensions, a trolley wheel mounted therein, an arm pivoted within said downward extensions, a coiled spring around said pivot point and exerting pressure against said arm, a second trolley wheel, and means to connect said second trolley wheel to said arm for transverse movement thereof.

10. In a trolley, a supporting means, a harp mounted for rotation thereon comprising two brackets having downward extensions, a trolley wheel mounted therein, an arm pivotally connected to said downward extensions and having pressure exerting means associated therewith, a second trolley wheel, and a second arm to support said second trolley wheel pivotally connected to said first arm.

11. In a trolley, a supporting means, a harp mounted for rotation thereon comprising two brackets having downward extensions, a trolley wheel mounted therein, an arm pivotally connected to said downward extensions and having pressure exerting means associated therewith, a second trolley wheel, and a second arm to support said second trolley wheel pivotally connected to said first arm and movable transversely thereof.

12. In a trolley, a supporting means, a harp mounted for rotation thereon comprising two brackets having downward extensions, a trolley wheel mounted therein, an arm pivotally connected to said downward extensions and having pressure exerting means associated therewith, a second trolley wheel, a second arm to support said second trolley wheel pivotally connected to said first arm and movable transversely thereof, and flexible electrical connections between said trolley wheels and said supporting means.

13. In a trolley, a supporting means, a harp having downward extensions mounted for rotation thereon, a trolley wheel mounted therein, a second trolley wheel, and means connecting said second trolley wheel with said downward extensions.

14. In a trolley, a supporting means, a harp having downward extensions mounted for rotation thereon, a trolley wheel mounted therein, an arm connected with said downward extensions, a second trolley wheel, and means to connect said second trolley wheel to said arm for transverse movement thereof.

15. In a trolley, a supporting means, a harp having downward extensions mounted for rotation thereon, a trolley wheel mounted therein, an arm pivotally connected with said downward extensions and movable vertically thereof, a second trolley wheel, and a second arm to support said second trolley wheel pivotally connected to said first arm and movable transversely thereof.

16. In a trolley, a rotatable harp, supporting means therefor, a trolley wheel mounted therein, an arm having a fork-like end pivotally connected to said harp, a second trolley wheel, and a second arm pivotally connected within the fork-like end of said first arm.

17. In a trolley, a rotatable harp, supporting means therefor, a trolley wheel mounted therein, an arm having a fork-like end pivotally connected to said harp, a second trolley wheel, and a second arm pivotally connected within the fork-like end of said first arm for transverse movement thereof.

18. In a trolley, a rotatable harp, supporting means therefor, a trolley wheel mounted therein, an arm having a fork-like end pivotally connected to said harp and movable vertically thereof, a second trolley wheel, and a second arm pivotally connected within the fork-like end of said first arm.

In testimony whereof I have hereunto set my hand.

FREDERICK C. COSEO.